Tinker and Sprague,
Mower.
No. 1964. Reissued May 23. 1865
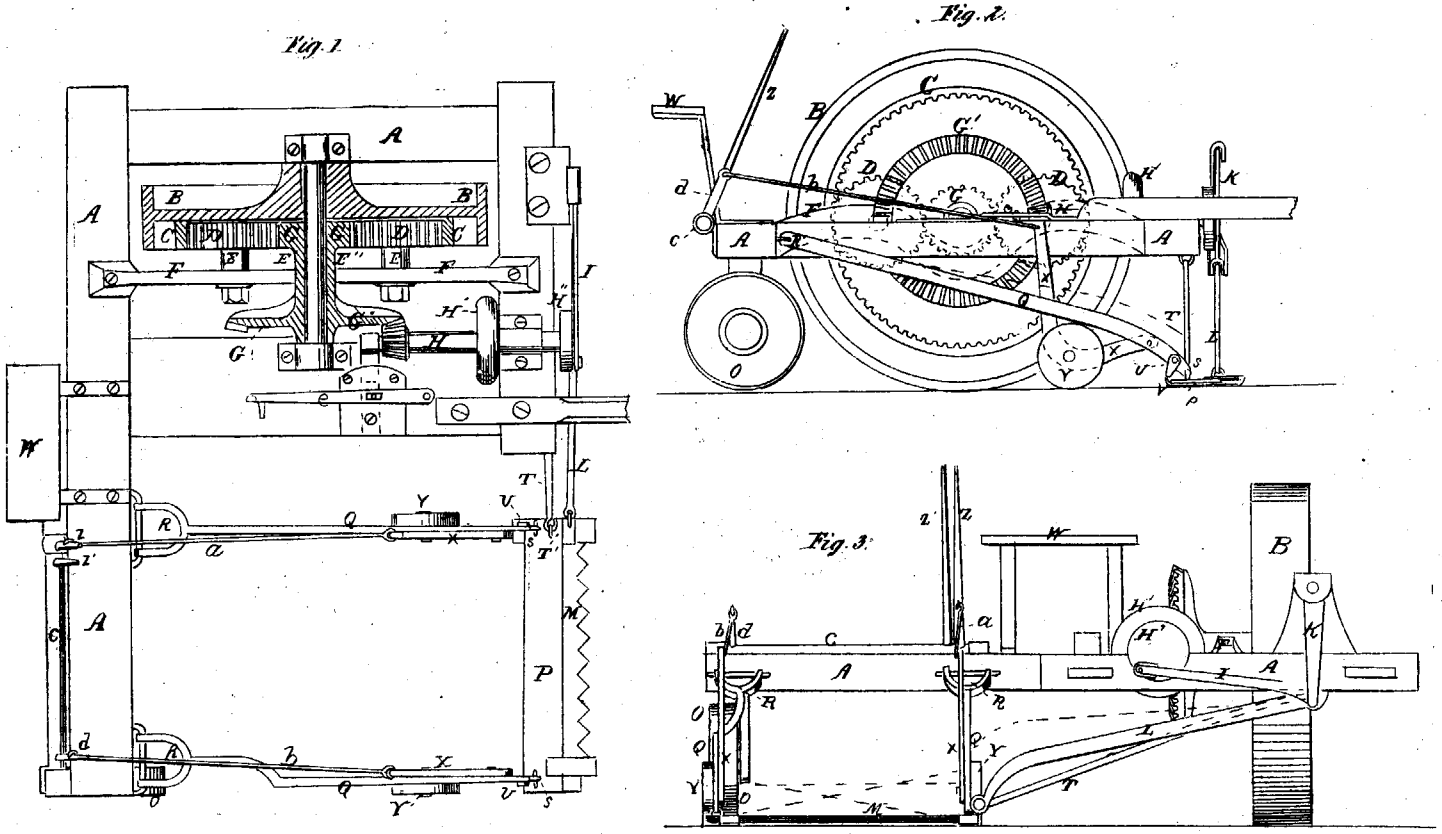
Witnesses
Henry L. Ellis
J. Henry Hey
Edwin Jones
by his Attorney
Thos. H. Dodge

UNITED STATES PATENT OFFICE.

EDWIN JONES, OF CLEVELAND, OHIO, ASSIGNEE OF CHARLES TINKER AND I. A. SPRAGUE.

IMPROVEMENT IN HARVESTERS.

Specification forming part of Letters Patent No. 17,945, dated August 4, 1857; Reissue No. 1,964, dated May 23, 1865.

*To all whom it may concern:*

Be it known that CHARLES TINKER and I. A. SPRAGUE, of Mantua, in the county of Portage and State of Ohio, have invented new and useful Improvements in Grass-Harvesters or Mowing-Machines, of which the following is a full, clear, and exact description thereof, reference being had to the accompanying drawings, in which—

Figure 1 is a top view of the machine, with a part of the main wheel and gear G G′ broken away; Fig. 2, a side elevation, and Fig. 3 a front elevation.

Similar letters of reference indicate corresponding parts in the several figures.

In the drawings, A represents the frame of the machine, and B the driving-wheel. Wheel B has an interior rim, C, Fig. 2, furnished with cogs upon its inner surface. These cogs drive two pinions, D D, which are supported on journals E E, that pass through the bar F, which is bent downward, so as to let the shaft of the main wheel pass above it, as seen at E′, Fig. 1. The shaft of the main wheel forms the journal or bearing of the bevel-wheel G′, which has a hollow shaft or socket, through which the main shaft passes. By this mode of construction the expense of a separate journal and boxes for the same, for the bevel-gear wheel which drives the crank-shaft gear, are dispensed with, while space is economized. A small spur-gear, G, on the end of the socket or hollow shaft F′ gears into both the wheels D D, standing as it does between them, and being concentric with the main wheel it receives its power equally from both the wheels D D, this power and motion being communicated to the bevel-wheel G′, which is situated upon the same shaft, and which is also concentric with the main wheel. This bevel-wheel G′ drives the crank-shaft H, upon which is the balance-wheel H′ and the crank-wheel H″, Fig. 3. The connecting-rod I extends from the crank to the vibrating suspension-rod K. By this means another connecting-rod, L, is put in motion, and this, by its connection with the cutter-bar M, gives motion to the cutter, as indicated in Figs. 1 and 3. The end of the frame, which carries the cutter-bar and its appendages, is supported by a ground-wheel, O, Figs. 1 and 2. The cutter-bar M and finger-bar P are supported upon or by long arms Q Q. These arms or supports divide before reaching the rear part of the frame A, to give greater strength, as seen at R R, and their forked ends are secured by long staples or their equivalents, which pass through holes in their forked or branching ends, and then, turning up at right angles, enter the frame A. The holes through which the staples pass are oblong on the outer ends of each arm, as seen at R′, Fig. 2, to allow of a little vibration necessary to the free action of the several parts, as hereinafter described. The finger-bar P, for the greater convenience in operating the machine, managing the team, and enabling the driver to use his right hand in elevating and depressing the finger-beam, is arranged upon the right-hand side of the frame which supports the driver, and nearly on a line with the front thereof, and is attached at each end to one of the arms Q by a link or universal joint, as seen at S S, Figs. 1 and 2, thus allowing the cutter and finger-bar to rise and fall with the inequalities of the ground, or one end can rise while the other falls, or vice versa, and thus the cutter-bar can adapt itself to elevations and depressions in every direction, independent of the up and down motions of the frame which supports the driver and gearing or apparatus which drives the cutter, so that but little friction is caused by the drag of the finger-bar on the ground.

For the purpose of guarding against a sidewise or lateral strain a long rod, T, is attached by a link or joint to the inner end of the finger-bar P, as seen at T′. The opposite end of this rod is attached to the under side of the forward part of the frame A by a link-joint at a point coinciding in its position with the union of the two connecting-rods I and L—that is, the rod T has just the same length as the connecting-rod L, which drives the cutter-bar. By this arrangement the cutter-bar and its appendages are free to move in any direction, except sidewise. In order, however, to prevent the cutter-bar and finger-bar from tipping forward and the guards digging into the ground when the machine is in operation, and also to retain said cutter and finger bars in proper horizontal positions when raised to pass obstructions, knuckles or stops U U are applied to the under side of the forward part of the arms Q Q, which strike upon the heels of the shoes V. This allows the cutter-bar to vibrate upward from a horizontal position, but will not allow the forward edge to drop below the horizontal plane.

By the above arrangement, when the machine is in operation, the front or points of the guards can freely rise or turn up to pass over slight bunches or elevations, whereby the draft of the machine is rendered easy, and a close cut of stubble insured without danger of catching the points of the guards in the ground.

For the purpose of placing the cutter-bar entirely under the control of the driver as he sits upon his seat W, so that he may raise it from the ground, in order to avoid coming in contact with a stone or other obstruction, either in the middle or at either end of the cutter-bar, bent levers X X′ are attached by their shorter arms to the forward ends of the arms or supports Q Q.

The journals of the wheels Y Y pass through the angles of the levers X X′, and as the face of the wheels rest upon the ground the journals of the said wheels form the fulcrums of said levers. The long arms of the levers X X′ extend upward and are respectively united to or coupled with the hand-levers Z and Z′ (shown in Fig. 3) by the side of the seat W and at Z and Z′, in Figs. 1 and 3, by means of connecting-rods *a* and *b*, Fig. 1. The rod *a* connects with the lever Z, and by drawing back the upper end of this lever, in the direction of the arrow, to a vertical position, (see red line in Fig. 2,) the inner or left-hand end of the cutter-bar can be elevated to avoid any obstacle that may be seen ahead by the driver. The lever Z′ being attached to a rock-shaft, *c*, that extends along the frame-work A from the seat W toward the right, and having an arm, *d*, extending upward a distance corresponding to the point of attachment of the rod *a* to the lever Z, as at *d*, Fig. 2, so that as said lever Z′ is drawn backward in the same manner as has been described in reference to the lever Z, the outer end of the cutter-bar can, in like manner, be raised from the ground at the pleasure of the driver, in order to avoid any obstruction; or the whole cutter-bar and its appendages can be raised so as to entirely clear the ground. In this movement of one or either or both of the levers Z and Z′ the weight of the cutter-bar and its appendages is transferred, in whole or in part, as one or both the levers are withdrawn or drawn back, to the wheels Y Y, which form the fulcrums of the bent levers X X′.

A′ represents a section of the tongue or draft-beam, which is fastened to the front of frame A.

In moving the machine from place to place or from one field to another both the levers Z and Z′ are drawn backward, as described, and secured at the same time the bevel-wheel upon crank-shaft H is thrown out of gear by the sliding lever *e*, and the whole machine is drawn over the ground upon the four wheels B O Y Y. The bevel-wheel upon the shaft H being slipped into gear and the levers Z and Z′ released, the machine is ready for operation again. In backing the machine out of the grass, or in turning a corner, or in passing over mowed grass, the advantages of this arrangement become most apparent.

The finger-beam above described is what I call a "hinged floating finger-beam," since it is free to rest and float upon the ground, conforming to the inequalities thereof bodily or at either end without wrenching or twisting its connection with the main frame of the machine. The finger-beam can rise and fall bodily; or one end can rise and fall while the other end rests on the ground or remains in the same horizontal plane in which it may be at the time; or one end can freely rise above a given horizontal plane while the other end at the same time falls freely below said plane to conform to the inequalities of the ground, all of said motions being independent of the up and down motions of the main frame. It will thus be seen that the finger-beam carries the cutter close to the ground, although uneven, whereby a close, even, and uniform cut of stubble is obtained.

I do not wish to be understood as claiming any feature shown or described in the patent granted to Sylla and Adams, September 20, 1853; P. Sylla, April 17, 1855; J. Darling, March 7, 1846; C. Wheeler, Jr., February 6, 1855; T. S. Steadman, May 23, 1854, and J. Swartz, November 14, 1854; but

What I claim, and desire to secure by Letters Patent as the invention of the said CHARLES TINKER and I. A. SPRAGUE, is—

1. Arranging the finger bar or beam in a mowing-machine upon the right-hand side of the frame which supports the driver and gearing, and on a line, or nearly so, with the front of said frame, in combination with supporting it in such position so that the entire finger-beam, or either end thereof independent of the other end, and without twisting or straining the joints or connections, can freely rise and fall to conform to the inequalities of the ground, independent of the up and down motions of the frame, substantially as described.

2. The combination, with the main frame of a mowing-machine, of a narrow finger-beam for sustaining a reciprocating cutter-bar and cutters, so hinged and supported that the entire bar, or either end thereof independent of the other end, and without twisting or straining the joints or connections, can freely rise and fall to conform to the inequalities of the ground, independent of the up and down motions of the main frame, while the front of the bar and points of the guards are also free to rock or roll up and then back again to the same horizontal plane upon an axis of motion near the back of the finger-beam, and independent of the up and down motions of the hinged supports from which the finger-beam derives its progressive motion.

3. The combination, in a mowing-machine, with the shoe which supports the heel of a hinged or floating finger-beam free to rise bodily or at either end, as described, of a knuckle or stop, separate from the hinge, to prevent downward deflection when the beam is raised, substantially as described.

4. The combination, with the main frame of a mowing-machine, having a hinged floating finger-beam free to rise entire or at either end, as described, independent of the up and down motions of the main frame, of mechanism so combined therewith as that the driver from his seat on the machine can elevate as pleasure the finger-beam and cutters in nearly a horizontal position to pass obstructions.

5. The combination, in a mowing-machine, with a floating hinged finger-beam free to rise bodily or at either end, as described, independent of the up and down motions of the main frame, of mechanism so constructed and arranged that the driver from his seat on the machine can elevate not only the entire beam but either end thereof at pleasure, to pass obstructions.

6. The combination, with a hinged finger-beam, in a mowing-machine, of a hinged lever and small ground-wheel, in such a manner that the point or outer end of the finger-beam can be elevated above the heel to pass obstructions, and the weight thereof thrown upon the small wheel which serves as the fulcrum of the lifting-lever.

7. Hinging the shoe to which the heel of the finger-beam is attached in a mowing-machine to a support which extends back and divides and is in turn hinged to the frame which supports the gearing by its two forks or branches, whereby said hinged support is rendered more firm and secure.

8. The combination of lever X, wheel Y, and rod *a*, with hinged lever Z, when applied to a hinged floating finger-beam, substantially as and for the purposes set forth.

9. The combination of the main frame A, hinged floating finger-beam, draft-tongue, and wheels B and O, substantially as described.

10. The combination of lever X, wheel Y, and rod *b*, with hinged lever Z′, when applied to a hinged floating finger-beam, substantially as and for the purposes set forth.

11. The arrangement of the pendant K with the pitmen I and L, as and for the purposes shown and described.

12. The combination and arrangement of the gears C D D′ and G and G′, substantially as set forth.

EDWIN JONES.

Witnesses:
EDWIN FULLER,
W. A. NEFF.